United States Patent [19]

Wetzel

[11] Patent Number: 4,989,084
[45] Date of Patent: Jan. 29, 1991

[54] AIRPORT RUNWAY MONITORING SYSTEM

[76] Inventor: Donald C. Wetzel, 65 Jacqueline Dr., Berea, Ohio 44017

[21] Appl. No.: 440,773

[22] Filed: Nov. 24, 1989

[51] Int. Cl.$^5$ ............................................. H04N 7/18
[52] U.S. Cl. ...................................... 358/108; 358/87; 358/107; 358/125; 358/103; 244/114 R
[58] Field of Search ..................... 358/87, 93, 108, 109, 358/906, 103, 105, 107, 125, 126, 347, 228, 229, 113, 225; 364/439; 244/1 TD, 114 R

[56] References Cited

U.S. PATENT DOCUMENTS

| | | | |
|---|---|---|---|
| 3,010,024 | 11/1961 | Barnett et al. | 358/125 |
| 3,217,098 | 11/1965 | Oswald | 358/108 |
| 3,278,680 | 10/1966 | Hummel | 358/225 |
| 3,484,549 | 12/1969 | Ricketts et al. | 358/113 |
| 3,686,434 | 8/1972 | Lemelson | 358/105 |
| 4,816,828 | 3/1989 | Feher | 358/103 |

Primary Examiner—John K. Peng
Assistant Examiner—Safet Metjahic
Attorney, Agent, or Firm—Pearne, Gordon, McCoy & Granger

[57] ABSTRACT

A system for monitoring and recording the movement of aircraft and their external characteristics and paths during and after landing and take-off from an airport runway detects malfunctions, pilot error, equipment failure or other evidence that might assist in determining the cause of a crash or other malfunction. The system includes a plurality of video cameras located adjacent to the runway, a video recording device for saving information from the cameras, and video transmission means connecting the cameras to the recording device.

14 Claims, 1 Drawing Sheet

AIRPORT RUNWAY MONITORING SYSTEM

BACKGROUND OF THE INVENTION

1. Field of the invention

This invention relates to monitoring systems and more particularly to a system that monitors and records the movement of aircraft and their external characteristics and paths during and after landing and take-off from a runway, to detect malfunctions, pilot error, equipment failure or other evidence which might assist in determining the cause of a crash.

2. Description of the prior art

Today's travel oriented society has caused a significant increase in the volume of airline traffic. A concomitant of this increased volume is a higher number of aircraft crashes. A great number of crashes, possibly the majority, occur during the aircrafts' approach, arrival or departure from an airport. Aircraft crashes cost many people their lives every year and lead to substantial economic losses to airlines and insurance companies. If methods were available to facilitate determination of the exact causes of crashes preventative steps could be initiated to eliminate those causes thus reducing the number of crashes.

A recent crash of a Douglas DC-9 in Detroit occurred because one wing of the airplane struck a telephone pole during take-off. The airplane rolled to an inverted position and crashed on an adjacent freeway. The probable cause, determined by investigation and certain assumptions, was that the wing flaps were not placed in the take-off position by the flight crew. The airplane consequently did not have the proper lift and flight characteristics to achieve take-off. However, a pilot in another aircraft in close proximity who was observing the DC-9's take-off roll steadfastly maintained he saw that the flaps were extended. If a visual record of the exterior portion of the aircraft during take-off were available, there would be no contention.

This is one example of the causes of aircraft crashes. Other causes might be a flock of birds becoming engulfed in an aircrafts' engines causing the engines to stall, a small plane striking another aircraft, a fire occurring in the engines, landing gear malfunctioning, or excessive ice building up on the wings or fuselage. Evidence such as whether the aircraft rolled properly after take-off, whether smoke was generated from a particular part of the aircraft or whether the aircraft's exterior mechanics were proper for flight would contribute greatly to the resolution of the causes of aircraft crashes if visually recorded.

Present methods of gathering evidence to determine the cause of crashes have proven to be inadequate. Very often these methods do not answer all the questions concerning the crash. The on-board flight recorder or "black box" which records voice communications of the cockpit and other flight information is the primary source of evidence. This recording along with witness testimony is often the only evidence available. If there is conflicting testimony among witnesses, or if witnesses' testimony conflicts with the "black box" recording the true cause of a crash may never be ascertained.

Causes of some past crashes have remained unsolved because not enough evidence was available to analyze why the crash occurred. Very often there remains unanswered questions regarding the external characteristics of an airplane during a crash. At a minimum, recorded visual data could provide an answer to this question even if no safety precautions resulted therefrom, as in the case of a flock of birds flying into an engine causing it to stall. In this respect, recorded visual data would contribute to the resolution of legal disputes such as whether an airline negligently caused a crash or whether the crash resulted from unforeseen or unavoidable consequences. Thus, a system for gathering and recording visual evidence surrounding aircraft crashes is necessary to help reliably determine their causes.

SUMMARY OF THE INVENTION

The present invention provides an airport runway monitoring system for monitoring the external characteristics of aircraft before, during or after taking off from or landing on a runway to detect unusual events such as collisions with other objects, equipment malfunctions, pilot errors or other problems which may lead to a crash. It is an object of this invention to provide a means for visually monitoring the movement and the external characteristics of aircraft, then recording that information so it can be analyzed in the event of a crash or other disabling event. Once the recorded information is analyzed, the causes of the crash or other event may be determined and safety precautions implemented to prevent accidents from occurring due to similar causes.

The invention comprises a plurality of video cameras located adjacent to an active runway which view, through appropriate lensing, the landing and take-off of every aircraft using the runway. The video signals generated by these cameras are transmitted to a recording station where the signals are recorded on one or more video recording machines. Once recorded, the data is stored for a certain period of time so it can be reviewed if necessary.

The video cameras are positioned adjacent to the runway in such a configuration that the path of each aircraft is monitored for as long as practically possible during its take-off or landing. When aircraft are landing or taking off they may be considered to be traveling through a sequence of zones defining their path. When landing, an aircraft approaches the runway on its glideslope, touches down in a touchdown zone, decelerates through a deceleration zone and achieves taxiing speed in a taxiing speed zone. Similarly, when taking off, an aircraft initiates its thrust in an initial thrust zone, accelerates through an acceleration zone, lifts off in a accelerates through an acceleration zone, lifts off in a lift-off zone and ascends on its flight path. To monitor aircraft passing through these various zones the aforementioned plurality of video cameras is used. Each video camera is pointed or trained at a fixed position relative to the runway so it can monitor aircraft whether they are landing on or taking off from the runway in either direction.

The configuration of video cameras is such that there are first and second video cameras, one at each end of the runway, used to monitor aircraft either descending on their glideslope when landing, or ascending onto their flight path when taking off. A third and a fourth camera are staggered relative to each other, one on each side of the runway, to monitor aircraft from the touchdown zone through the taxing speed zone when landing or from the initial thrust zone through the lift-off zone when taking off. Additionally, a fifth and a sixth camera may be positioned, one on either side of the runway, to monitor aircraft while they are in either the acceleration or deceleration zone. The fifth and sixth cameras may also observe aircraft once they have achieved taxiing speed or when the aircraft engage their initial thrust.

The preferred embodiment of the invention utilizes the first, second, third, and fourth cameras as positioned above to effectively monitor aircraft for as long as practically possible when using a runway. The cameras may be repositioned relative to the runway, or additional cameras may be used so that the aircraft are continuously monitored over their anterior, posterior, side, and underneath sections when landing or taking off. Preferably, each camera is equipped with appropriate camera lensing having high resolution, telephoto capability, automatic focusing and iris control. Additionally, each camera could be equipped with automatic target tracking thereby allowing each camera to follow each aircraft landing or taking off rather than having the camera in a stationary position.

The aforementioned positioning of the four video cameras comprising the preferred embodiment of the invention is effective for airports using a single runway; however, the majority of airports use at least two runways so they can accommodate take-offs and landings during various wind conditions. A second runway, having the same series of zones as the first runway, is usually positioned obliquely to the runway described above, and consequently additional video cameras are required to effectively monitor both runways. Thus, a second embodiment of the invention adds fifth, sixth, seventh and eighth cameras positioned adjacent to the second runway. The fifth and sixth cameras are positioned, one at each end of the second runway to monitor aircraft descending on their glideslope or ascending onto their flight path. The seventh and eighth cameras are staggered relative to each other, one on each side of the second runway, to monitor aircraft from the initial thrust zone through the lift-off zone or from the touchdown zone through the taxing speed zone. Preferably, when the second runway is introduced the third and fourth cameras positioned adjacent the first runway are repositioned closer to the obtuse angles formed between the two runways. This allows the third and fourth cameras to monitor both runways more effectively.

Preferably, each video camera is movably mounted on a support device at its aforementioned position. Each support device has connected thereto a means for moving the video camera. Thus, each camera may be rotated through a horizontal plane or tilted through a vertical plane to achieve the optimal monitoring position depending on which runway is in use and the angle of descent or ascent of the aircraft. The moving means controlling the movement of each camera are activated by a signal transmitted from a control device via transmission cables, microwave or other available technologies. The control device is activated by an operator whenever the wind direction dictates a change in the runway being used or some other factor requires the cameras to be retrained.

Additionally, each camera is preferably contained within an environmental housing protecting the camera from adverse weather conditions. Each environmental housing is suitably insulated to maintain a temperature at which a camera contained therein will properly function. Each housing has at least one window through which a camera will monitor the aircraft. Preferably, each window has a wiper and washer to maintain clarity of the window. The wiper and washers may be manually activate in conjunction with the previously mentioned control device.

The aforementioned configuration of video cameras and method for recording the visual data gathered by the video cameras is an effective tool for facilitating the resolution of aircraft crashes. Review and analysis of such recorded data will often resolve what would otherwise remain a mystery.

DESCRIPTION OF THE PREFERRED EMBODIMENT

Figure 1:
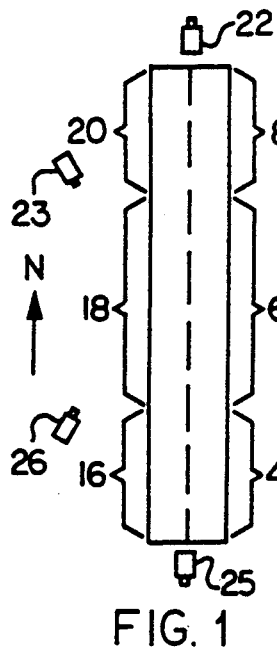
FIG. 1 is a plan view of on embodiment of the present invention showing a runway and the associated zones through which aircraft travel when landing or taking off in a south to north direction and the positions of the cameras used to monitor the aircraft.

Referring more particularly to the drawings and initially to FIG. 1, there is shown a runway 2 and the associated zones through which aircraft must travel when landing or taking off. The runway 2 illustrates aircraft landing and taking off in a south to north direction. Aircraft generally land and take-off in the same direction, i.e., into the wind, so take-offs and landings will occur simultaneously in the same direction.

Figure 2:
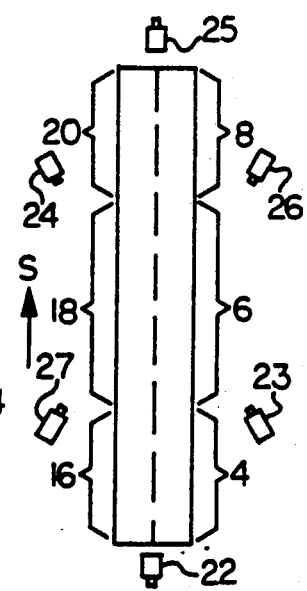
FIG. 2 is a plan view of the runway in FIG. 1 with the associated zones for aircraft landing or taking off in a north to south direction.

For convenience, the zones through which aircraft travel when landing or taking off are depicted in FIG. 1. These zones are the same if aircraft are landing or taking off in the direction opposite that shown in FIG. 1 except that the zones are correspondingly be in the reverse order as shown in FIG. 2. Each zone represents a different phase of landing or take-off. If aircraft are taking off from runway 2 in a south to north direction, the aircraft initially approach the southern end of the runway 2 and position themselves in a northerly direction preparing for take-off. From this point the aircraft travel through an initial thrust zone 4, an acceleration zone 6, a lift-off zone 8 and ascend onto their flight paths. The initial thrust zone 4 is that portion of runway 2 where the aircraft initiate the engine thrust and begin to accelerate down the runway 2. As the aircraft travel down the runway 2, they accelerate through the acceleration zone 6 which is that portion of the runway 2 in which the aircraft to attain enough velocity to begin lift-off. The lift-off zone 8 is that portion of the runway 2 through which the aircraft travel from the point where the aircraft lift their nose wheel off the runway 2 to the end of the runway. Once lift-off is achieved the aircraft ascend onto their flight paths.

A similar series of zones is used when aircraft are landing in a south to north direction on the runway 2. As the aircraft approach the southern end of the runway 2 on their glideslope they descend until landing in a touchdown zone 16, then travel through a deceleration zone 18 and a taxiing speed zone 20. The touchdown zone 16 is that portion of the runway 2 from the end of the runway to a point where the nose wheel touches the runway 2. Once the aircraft touch down, they decelerate through the deceleration zone 18 which is that portion of runway 2 in which the aircraft decelerate from their touchdown speed to their taxiing speed. Once the aircraft attain taxiing speed, they travel through the taxiing speed zone 20 which is that portion of runway 2 from the point where the aircraft achieve taxiing speed to the point where the monitoring system no longer observes the aircraft.

The aforementioned zones are not absolute in size or location on the runway 2 but will vary with the flight path, weather conditions, point of touchdown, size and speed of each aircraft using the runway 2 and the length of the runway 2. Thus, each aircraft will define its own series of zones. The concept of the invention is that each aircraft is continuously monitored by the plurality of video cameras as it passes through the various zones and not that any particular camera must monitor each aircraft through a particular zone. The use of the zones illustrates that each aircraft is continuously monitored at all stages during take-off and landing.

Also shown in FIGS. 1 and 2 are the positions of six video cameras 22, 23, 24, 25, 26 and 27. According to the preferred embodiment of the invention, the cameras 22, 23, 24 and 25 will monitor the aircraft landing and taking off from the positions shown in FIGS. 1 and 2, such positions being more fully described hereinafter. The cameras 26 and 27 are shown to illustrate where additional cameras may be positioned if desired. Also, the location of the cameras 22, 23, 24 and 25 may be changed provided the aircraft are effectively monitored for as long as practically possible. These four cameras should monitor the aircraft regardless of the direction in which the aircraft are traveling at the time they are using the runway 2 for take-offs and landings.

The direction in which aircraft use the runway 2 during take-off and landing is primarily dictated by wind direction. Since aircraft generally land and take-off into the wind, runway 2 is used for both take-offs and landings simultaneously. Accordingly, the same runway 2 is used for take-offs and landings in a north to south direction at certain times and for take-offs and landings in a south to north direction at other times. The cameras 22, 23, 24 and 25 are trained to monitor the aircraft traveling in these directions for as long as practically possible.

The camera 22 is positioned adjacent to the northern end and along the longitudinal axis of the runway 2 and is trained in a northerly direction. Preferably, the camera 22 is vertically tiltable from horizontal through 60 degrees so it can monitor aircraft regardless of their varying angles of descent or ascent. Aircraft generally ascend at an angle steeper than that at which they descend, so tiltability of the camera 22 is desired. The camera 22 is preferably horizontally rotatable through a sweep close to 360 degrees so it can be retrained to monitor aircraft using other runways when necessary or to monitor aircraft banking sharply onto their flight path.

The cameras 23 and 24 are staggered relative to each other with the camera 23 adjacent to the west side and north end of the runway 2 and the camera 24 adjacent the east side and south end of the runway 2. The camera 23 is trained in a generally southeasterly direction, and the camera 24 is trained in a generally northwesterly direction with both cameras 23 and 24 angled inwardly toward the longitudinal axis of the runway 2. Preferably, the cameras 23 and 24 are vertically tiltable from horizontal through 45 degrees above the horizon so they can effectively monitor varying flight paths of aircraft. Depending upon the lensing used, the cameras 23 and 24 may also monitor aircraft while descending or ascending. The cameras 23 and 24 are preferably horizontally rotatable through a sweep close to 360 degrees so they can be retrained to monitor aircraft using other runways when necessary.

The camera 25 is positioned adjacent to the south end and along the longitudinal axis of the runway 2 and is trained in a southerly direction. Preferably, camera 25 is vertically tiltable from horizontal through 60 degrees above the horizon so it can monitor the aircraft regardless of their varying angles of descent or ascent. The camera 25 is also preferably horizontally rotatable through a sweep close to 360 degrees so it can be retrained to monitor other runways, and to monitor banking aircraft as long as possible.

The aforementioned directions in which the cameras 22, 23, 24 and 25 are trained remain essentially the same regardless of whether aircraft are using the runway 2 to land or take-off in a north to south direction or south to north direction. This eliminates the necessity of retraining the cameras depending upon whether aircraft are landing or taking off in different directions. The only adjustments which may be necessary are the angle at which the cameras are tilted (depending upon the aircrafts' angle of ascent or descent) and the horizontal direction of the cameras 22 and 25 at the ends of the runway (depending upon the degree of banking during the aircrafts' ascent).

As previously mentioned, additional cameras may be used if desired. For example, FIG. 1 shows the cameras 26 and 27 positioned symmetrically to the cameras 23 and 24. Both the cameras 26 and 27 could be horizontally rotatable and vertically tiltable if desired to assist in monitoring the aircraft.

Referring again to FIG. 1, when aircraft are using the runway 2 to take-off in a south to north direction, they are initially monitored by the camera 23 from the initial thrust zone 4 through the acceleration zone 6. In the acceleration zone 6, the camera 24 begins to monitor the aircraft and continues to monitor the aircraft into the lift-off zone 8. The camera 24 continues monitoring the aircraft until they begin ascending where the camera 22 begins monitoring the aircraft. The camera 22 continues to monitor the aircraft until they roll out onto their flight path and are no longer capable of being monitored by the system.

If the aircraft are using the runway 2 to land in a south-to-north direction, the aircraft are initially monitored by the camera 25 beginning on their glideslope and ending approximately just before the aircraft land in the touchdown zone 16. Prior to landing the camera 23 monitors the aircraft into the touchdown zone 16 and through the deceleration zone 18. The camera 24 then monitors the aircraft in the deceleration zone 18 and to the taxiing speed zone 20. Finally, the camera 24 monitors the aircraft through the taxiing speed zone 20 and until the aircraft no longer needs to be monitored.

If aircraft are using runway 2 to take-off or land in a north-to-south direction the zones will correspond to those shown in FIG. 2. Thus, aircraft taking-off in a north to south direction are initially monitored by the camera 24 from the initial thrust zone 4 through the acceleration zone 6. The camera 23 then monitors the aircraft from the acceleration zone 6 through the lift-off zone 8 until the aircraft lift-off. The camera 25 then monitors the aircraft as they roll out onto their flight path until the aircraft are no longer capable of being monitored by the system.

Aircraft landing in a north to south direction are initially monitored by the camera 22 while they come down their glideslope to a point just before they land. As the aircraft touchdown in the touchdown zone 16 they are monitored by the camera 24 until they enter the deceleration zone 18 at which time they are monitored by the camera 23. The camera 23 monitors the aircraft from the deceleration zone 18 through the taxiing speed zone 20.

As previously mentioned, the landing and take-off zones vary with each aircraft so there will be some overlap of zones for each camera to monitor. For example, referring to FIG. 1, smaller aircraft may generally land at a point further along the runway than larger aircraft because smaller aircraft require less runway to achieve taxiing speed. Thus, a smaller aircraft's landing zone may be at a point on the runway 2 where it is simultaneously monitored by the cameras 23, 24.

Figure 3:
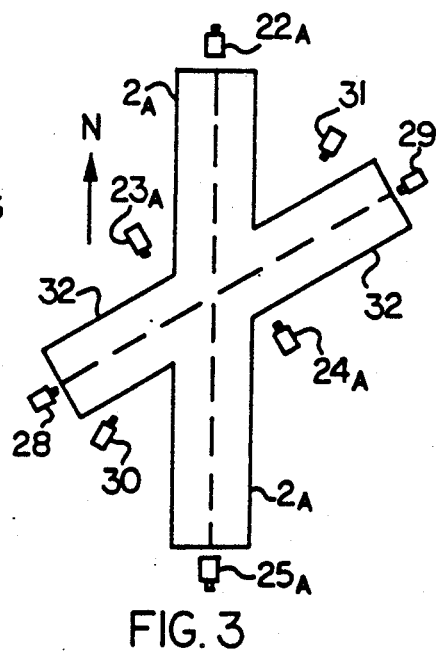
FIG. 3 is a plan view of another embodiment of the present invention showing two runways and the position of the cameras and the direction in which they are trained to monitor aircraft using the runway in a north south direction.

Referring to FIG. 3, there is depicted the typical arrangement of runways at airports having two runways. The arrangement provides more than one operational runway for use depending upon wind direction. FIG. 3 shows a second embodiment of the invention having fifth, sixth, seventh and eighth cameras 28, 29, 30 and 31 in addition to the cameras 22A, 23A, 24A and 25A corresponding to the cameras 22, 23, 24 and 25 previously described. The cameras 28, 29, 30 and 31 are trained to monitor aircraft in conjunction with the cameras 22A, 23A, 24A and 25A when the aircraft are using the runway 2A. The camera 28 is located adjacent to the southwest end and along the longitudinal axis of the runway 32, and the camera 29 is located adjacent to the northeast end of the runway 32 along its longitudinal axis. The camera 28 is trained in a generally northeasterly direction, and the camera 29 is trained in a generally southwesterly direction along the longitudinal axis of the runway 32. Both the cameras 28 and 29 are preferably vertically tiltable from horizontal through 60 degrees above the horizon and are horizontally rotatable through a sweep close to 360 degrees.

The cameras 30 and 31 are staggered relative to each other with the camera 30 adjacent to the south side and the southwest end of the runway 32 and the camera 31 adjacent the north side and northeast end of the runway 32. The camera 31 is trained in a generally southwesterly direction, and the camera 30 is trained in a generally northwesterly direction; both the cameras 30 and 31 are angled inwardly toward the longitudinal axis of the runway 32, as shown in FIG. 3. The cameras 30 and 31 are preferably vertically tiltable through 45 degrees above the horizon horizontally and rotatable through a sweep close to 360 degrees.

When monitoring the runway 2A, the cameras 28 and 29 face one another and are generally pointed along the longitudinal axis of the runway 32. The use of cameras 28 and 29 in this manner helps to assure that the aircraft using runway 2A are continuously monitored from as many angles as possible. The cameras 28 and 29 generally monitor the aircraft in either the acceleration zone 6 or the deceleration zone 18 regardless of whether the aircraft are landing or taking off in either direction. Additionally, the cameras 30 and 31 monitor the aircraft through these zones. However, as previously mentioned, the zone in which any camera monitors an aircraft will depend upon the aircrafts' landing or take-off path.

The second embodiment of the invention as depicted in FIG. 3, shows cameras 23A and 24A located near the obtuse angles formed by the intersection of the runway 2A and the runway 32. This location is preferred because it allows the cameras 23A and 24A to monitor both runways 2A and 32 by horizontally rotating the cameras to the desired direction. In FIG. 3, the camera 24A is trained in a generally northwesterly direction, and the camera 23A is trained in a generally southeasterly direction. The cameras 23A and 24A thus monitor aircraft using the runway 2A in a manner similar to that of the cameras 23 and 24 in FIGS. 1 and 2. If this location is not sufficient to properly monitor the aircrafts, the cameras 23A and 24A could be relocated to positions similar to those of the cameras 23 and 24 in FIGS. 1 and 2, and two additional cameras could be added adjacent to the runway 32 one adjacent to the south side and northeast end trained in a generally northwesterly direction and the other adjacent to the north side and southwest end trained in a generally southeasterly direction.

Figure 4:
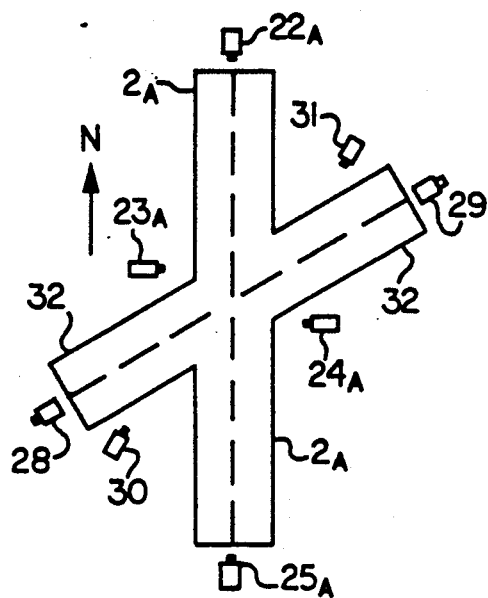
FIG. 4 is a plan view of two runways of FIG. 3 showing the cameras trained to monitor aircraft using the runway in a southwest and northeast direction.

Referring to FIG. 4, when the runway 32 is used the cameras 22A, 23A, 24A, 25A, 28, and 29 are retrained to effectively monitor the aircraft landing and taking off. The camera 22A is trained toward the south, and the camera 25A is trained toward the north, both aimed generally along the longitudinal axis of the runway 2A. The cameras 28 and 29 are retrained so that the camera 28 faces in a generally southwesterly direction and the camera 29 faces in a generally northeasterly direction, both cameras 28 and 29 aiming generally along the longitudinal axis of the runway 32. Also, the camera 23A is retrained in an easterly direction, and the camera 24A is retrained in a westerly direction. With the cameras so trained the aircraft using the runway 32 are continuously monitored whether they are landing northeast to southwest or southwest to northeast, or taking off northeast to southwest or southwest to northeast.

As previously mentioned, aircraft usually land and take-off into the wind and runways are typically used simultaneously for this purpose. The runway 32 can also be assigned zones through which aircraft travel similar to those depicted in FIGS. 1 and 2. Referring to FIG. 4, when aircraft are taking off from the runway 32 in a southwest to northeast direction they are initially monitored by the camera 31 in the initial thrust zone. As the aircraft proceed through the acceleration zone and the lift-off zone, they are also monitored by the cameras 30, 24A. The camera 31 also monitors the aircraft in the acceleration zone 6. The cameras 30, 23A continue monitoring the aircraft through the lift-off zone 8. The camera 29 monitors the aircraft as they ascend and roll out onto their flight paths.

Similarly, when aircraft are landing on the runway 32 in a southwest to northeast direction, they are initially monitored by the camera 28 on their glideslope to a point just before they land. When entering the touchdown zone, the aircraft are monitored by the camera 31 through the deceleration zone. The cameras 30, 24A and 23A also begin monitoring the aircraft as they enter the deceleration zone. The cameras 30 and 24A monitor the aircraft through the taxing speed zone.

When the aircraft take-off in a northeast to southwest direction, they are first monitored in the initial thrust zone by the camera 30. As the aircraft proceed through the acceleration zone they are monitored by the cameras 30, 31 and 23A. The cameras 24A and 31 continue to monitor the aircraft through the lift-off zone. Once through the lift-off zone, the camera 28 begins to monitor the aircraft as they ascend and roll out onto their flight path.

Also, when aircraft are landing in a northeast to southwest direction on the runway 32 they are initially monitored on their glideslope as they approach the runway 32 by the camera 29. Upon landing in the touchdown zone the cameras 30 and 23A monitor the aircraft through to the deceleration zone, where the cameras 31 and 24A begin to monitor the aircraft. The camera 31 monitors the aircraft through the deceleration zone into the taxiing speed zone until the aircraft are no longer monitored by the system. As previously mentioned, the cameras 22A and 25A are trained toward the center of the runway 32 and monitor aircraft generally in the acceleration zone and the deceleration zone.

Figure 5:
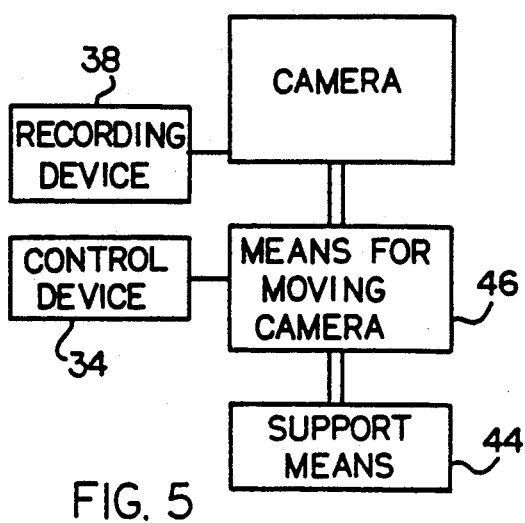
FIG. 5 is a schematic view of a video camera, moving means, support means, recording device, and control device used with the present invention.

The visual images obtained by these cameras must be recorded in case the data needs to be analyzed. As shown in FIG. 5, at least one recording device 38 is used for each video camera. The recording devices are used to record the signals transmitted to them from the cameras monitoring the aircraft. The recording devices might be conventional video cassette recorders or commercial recording machines depending on the volume of data to be recorded. Transmission means such as coaxial cables are used to transmit signals from the cameras to the recording devices. The signals may alternatively be transmitted to the recording devices by means such as microwave links, optical fibers, or other available technologies. Once these signals have been recorded they can then be accessed in case they must be analyzed. The recorded information may be stored for a predetermined amount of time depending upon its intended use. One option is to have the recording tape running continuously and simply record over existing data with old video information being erased and new information being recorded on the same portion of the tape after a designated period of storage time has elapsed. Redundant equipment might be used to insure no loss of data in the event of an equipment failure.

FIG. 5 shows a schematic view of a video camera mounted on a means for moving the camera which is connected to the support means 44. The moving means 46 allows each camera to be rotated horizontally or tilted vertically. As previously mentioned, it is preferable that the cameras 22, 25, 28, and 29 be tiltable from horizontal through 60 degrees above the horizon, and the cameras 23, 24, 30 and 31 be tiltable from horizontal through 45 degrees above the horizon. The tilting movement provides a full range of desirable monitoring positions between horizontal and vertical. For example, the cameras 22, 25, 28, and 29 which monitor the aircraft on their glideslope and ascent path must monitor the aircraft as long as possible. In order to accomplish this, the cameras must tilt upwardly from a horizontal position. The amount of tilting necessary depends upon the steepness of the aircrafts' glideslope or ascending flight path. Also, it is preferable that all the cameras be horizontally rotatable through a sweep close to 360 degrees. When moving means 46 is activated, it controls both the vertical and horizontal movement of the cameras.

The moving means 46 is activated by a control device 34 which is connected to each moving means 36 either by a set of coaxial cable transmission means 40 or other available technologies such as microwave or fiber optics. The control device 34 may be operated manually or automatically or through the use of sensory devices contained within each camera.

The purpose of horizontally rotating the cameras is to achieve the proper monitoring position relative to each runway. In order to detect evidence exterior to the aircraft it is beneficial to monitor the aircraft from several angles. Thus, when the operational runway changes, the directions in which some of the cameras are trained are also changed. Each camera is trained in a predetermined direction for each runway being monitored thereby providing the optimum monitoring arrangement of the available cameras. Furthermore, the preferred embodiment defines the use of four cameras for one runway and four additional cameras for two intersecting runways. This arrangement could be modified depending upon the size and configuration of the runways at any given airport. The number of video cameras necessary may also be a function of the type of lensing used. Each camera may be equipped with infrared technology lenses so aircraft can be monitored at night. Furthermore, each camera may be equipped with automatic target tracking thereby allowing each camera to follow that entire landing or take-off procedure of each aircraft rather than just a portion thereof.

In order to protect the cameras from adverse weather conditions it is preferable to enclose them within an environmental housing. Each environmental housing is placed over top of a camera, and its associated moving means and support means, thereby protecting each component. Preferably, the housing comprises a suitable insulated material which will maintain a desired operational temperature range therein in which the cameras will function. Also, each housing must have at least one window through which the cameras monitor the aircraft. Each window is preferably heated with a wiper and washer mechanism activated by the control device 34 to keep the window clear.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope or effect to the specific embodiment herein shown and described nor in any other way that is inconsistent with the extent to which the progress in the art has been advanced by the invention.

What is claimed is:

1. A system for monitoring aircraft taking off and landing on an airport runway, comprising:
   at least four video cameras located adjacent to the runway, each of the cameras being trained at a different portion of the runway, each of the video cameras adapted for transmitting video signals, said video cameras including:
      a first video camera located adjacent one end of the runway and generally along the longitudinal axis of the runway,
      a second video camera located adjacent the other end of the runway and generally along the longitudinal axis of the runway, a third video camera located adjacent one side of the runway and generally toward said one end of the runway, and a fourth video camera located adjacent the other side of the runway and generally toward said other end of the runway;

at least one video recording device for receiving the video signals transmitted by said video cameras; and video transmission means connecting the cameras to the recording device for transmitting the video signals from the video cameras to the video recording device;

whereby the monitoring system observes and records a visual image of aircraft depicting their external characteristics, the path taken by the aircraft before during and after landing or take-off from the runways, to detect malfunctions, pilot error, equipment failure or other evidence which may assist in determining the cause of a crash.

2. A system for monitoring aircraft as recited in claim 1, wherein, said first video camera is trained in a direction generally parallel to the longitudinal axis of the runway and away from the runway, said second video camera is trained in a direction generally parallel to the longitudinal axis of the runway and away from the runway, said third video camera is trained in a direction generally toward said other end of the runway and angled inwardly toward the longitudinal axis of the runway, said fourth video camera is trained in a direction generally toward said one end of the runway and angled inwardly toward the longitudinal axis of the runway.

3. A system for monitoring aircraft as recited in claim 1, comprising in addition support means upon which each of said video cameras is movably mounted.

4. A system for monitoring aircraft as recited in claim 3, comprising in addition:

means for rotating said video cameras horizontally and tilting said video cameras vertically, said rotating and tilting means being connected to said support means, whereby the directions in which said video cameras are trained are adjustable for various paths taken by the aircraft.

5. A system for monitoring aircraft as recited in claim 4, wherein, said first and second video cameras are rotatable through a horizontal sweep close to 360 degrees and vertically tiltable from horizontal through 60 degrees above the horizon, and said third and fourth video cameras are rotatable through a horizontal sweep close to 360 degrees and vertically tiltable from horizontal through 45 degrees above the horizon.

6. A system for monitoring aircraft as recited in claim 1, wherein, said video recording device is adapted to record the video data transmitted by said video cameras and store said video data for an extended period of time whereby the video data can be reviewed when necessary.

7. A system for monitoring aircraft as recited in claim 4, further comprising:

means connected to said rotating and tilting means for controlling the rotation and tilting of said video cameras, said controlling means located remotely from said video cameras and capable of being activated whenever necessary to move said video cameras.

8. A system for monitoring aircraft as recited in claim 1, wherein the airport has a second runway intersecting said aforementioned runway, further comprising:

a fifth video camera located adjacent to one end of the second runway and generally along the longitudinal axis of the second runway, a sixth video camera located adjacent to the other end of the second runway and generally along the longitudinal axis of the second runway, a seventh video camera adjacent to one side of the second runway and generally toward said one end of the second runway, and an eighth video camera adjacent to the other side of the second runway and generally toward said other end of the second runway.

9. A system for monitoring aircraft as recited in claim 8, wherein, said third video camera is adjacent to the intersection of the first and second runways, and said fourth video camera is adjacent to the intersection of the first and second runways.

10. A system for monitoring aircraft as recited in claim 8, wherein, said fifth and sixth video cameras are movably mounted on support means.

11. A system for monitoring aircraft as recited in claim 8, wherein, said fifth and sixth video cameras are horizontally rotatable through a sweep of close to 360 degrees and vertically tiltable from horizontal through 60 degrees above the horizon.

12. A system for monitoring aircraft as recited in claim 8, wherein, said fifth and sixth video cameras are controllable by controlling means.

13. A system for monitoring aircraft as recited in claim 2, wherein, each of said video cameras includes with infra-red means for monitoring at night.

14. A system for monitoring aircraft as recited in claim 1, wherein, each of said video cameras is equipped with appropriate focusing and iris control monitoring aircraft for as long as practically possible.

* * * * *

UNITED STATES PATENT AND TRADEMARK OFFICE
CERTIFICATE OF CORRECTION

PATENT NO. : 4,989,084

DATED : January 29, 1991

INVENTOR(S) : Donald C. Wetzel

It is certified that error appears in the above-identified patent and that said Letters Patent is hereby corrected as shown below:

Column 2, Lines 48-49, "lifts off in a accelerates through an acceleration zone," should be deleted.

Signed and Sealed this

Fifteenth Day of September, 1992

Attest:

DOUGLAS B. COMER

Attesting Officer     Acting Commissioner of Patents and Trademarks